United States Patent
Heck et al.

(10) Patent No.: US 11,139,087 B2
(45) Date of Patent: Oct. 5, 2021

(54) USE OF ISOLATION CONDENSER AND/OR FEEDWATER TO LIMIT CORE FLOW, CORE POWER, AND PRESSURE IN A BOILING WATER REACTOR

(71) Applicant: GE-Hitachi Nuclear Energy Americas LLC, Wilmington, NC (US)

(72) Inventors: Charles Lee Heck, Wilmington, NC (US); Michael M. Cook, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 196 days.

(21) Appl. No.: 16/381,147

(22) Filed: Apr. 11, 2019

(65) Prior Publication Data

US 2020/0328002 A1   Oct. 15, 2020

(51) Int. Cl.
 *G21C 7/32* (2006.01)
 *G21C 15/18* (2006.01)
 (Continued)

(52) U.S. Cl.
 CPC .............. *G21C 7/32* (2013.01); *G21C 1/084* (2013.01); *G21C 15/12* (2013.01); *G21C 15/18* (2013.01);
 (Continued)

(58) Field of Classification Search
 CPC ...... G21C 15/185; G21C 15/18; G21C 15/25; G21C 15/24; G21C 15/243; G21C 15/26;
 (Continued)

(56) References Cited

U.S. PATENT DOCUMENTS

| 4,810,460 A | 3/1989 | Gluntz |
| 4,812,286 A | 3/1989 | Gluntz |

(Continued)

FOREIGN PATENT DOCUMENTS

| EP | 0405981 A2 | 1/1991 |
| FR | 2041212 A1 | 1/1971 |
| JP | S60113190 A | 6/1985 |

OTHER PUBLICATIONS

International Search Report and Written Opinion dated Sep. 3, 2020 (corresponding to PCT/US2020/024146).

*Primary Examiner* — Darlene M Ritchie
(74) *Attorney, Agent, or Firm* — Harness, Dickey & Pierce, P.L.C.

(57) ABSTRACT

A method and apparatus of limiting power of a boiling water nuclear reactor system includes a reactor pressure vessel, a reactor core disposed in the reactor pressure vessel, a core shroud surrounding the reactor core, a downcomer region disposed between an inner surface of the reactor pressure vessel and the core shroud, a steam line connected to an upper end of the reactor pressure vessel and a condenser system that receives steam from the reactor pressure vessel. A portion of the condenser system condensate is returned to the reactor pressure vessel of the boiling water reactor inside the core barrel above the core rather than into the downcomer. Returning the condensate in this way increases the effectiveness of an isolation condenser system or if the condensate is a portion of the feedwater from the main condenser it provides an effective means to regulate core flow and core power.

9 Claims, 5 Drawing Sheets

(51) Int. Cl.
  *G21C 1/08* (2006.01)
  *G21D 3/14* (2006.01)
  *G21C 15/12* (2006.01)
  *G21D 5/06* (2006.01)
  *G21C 15/25* (2006.01)
(52) U.S. Cl.
  CPC ............ *G21C 15/185* (2019.01); *G21C 15/25* (2013.01); *G21D 3/14* (2013.01); *G21D 5/06* (2013.01)
(58) Field of Classification Search
  CPC .......... G21C 15/12; G21C 15/14; G21C 7/32; G21C 1/084; G21D 3/14; G21D 5/06; Y02E 30/30; Y02E 30/00
  See application file for complete search history.

(56) References Cited

U.S. PATENT DOCUMENTS

| | | | | |
|---|---|---|---|---|
| 5,106,571 | A | * | 4/1992 | Wade ................. G21C 15/18 376/283 |
| 5,271,044 | A | | 12/1993 | Hidaka et al. |
| 8,705,682 | B2 | | 4/2014 | Moen et al. |
| 2016/0293281 | A1 | * | 10/2016 | Katono ................. G21C 9/012 |

* cited by examiner

Core Flow for 3 ICs and 30-second Scram

— TOT CORE FLO (IC into UP)  — TOT CORE FLO (IC into DC)

Core Inlet Enthalpy for 3 ICs and 30-second Scram

— CORE IN ENTH (IC into UP)  — CORE IN ENTH (IC into DC)

ATWS with Different Number of IC Trains for 120-second scram

ATWS with Different Number of IC Trains for 120-second scram

USE OF ISOLATION CONDENSER AND/OR FEEDWATER TO LIMIT CORE FLOW, CORE POWER, AND PRESSURE IN A BOILING WATER REACTOR

BACKGROUND

Field

The present disclosure relates to the use of an isolation condenser and/or feedwater to limit core flow, core power, and pressure in a boiling water reactor.

Description of Related Art

This section provides background information related to the present disclosure which is not necessarily prior art.

A boiling water reactor is a light water nuclear reactor used for the generation of electrical power. Heat is produced by nuclear fission in the reactor core, and this causes the cooling water to boil, producing steam. The steam is directly used to drive a turbine after which it is cooled in a condenser and converted back to liquid water. This water is then returned to the reactor core, completing the loop.

In conventional boiling water reactors, the feedwater enters into a downcomer or annulus region and combines with water exiting the moisture separators. This is part of the normal operation of the boiling water reactor. The feedwater subcools the saturated water from the moisture separators and reduces the temperature of the water that enters the core. This water flows down the downcomer or annulus region, which is separated from the core by a tall shroud. The water then goes through either jet pumps or internal recirculation pumps that provide additional pumping power (hydraulic head). The water then moves up through the lower core plate into the nuclear core, where the fuel elements heat the water.

The heating from the core creates a thermal head that assists the recirculation pumps in recirculating the water inside of the reactor pressure vessel. A boiling water reactor can be designed with no pumps and rely entirely on the thermal head to recirculate the water inside of the reactor pressure vessel. The forced recirculation head from the recirculation pumps is very useful in controlling power, however, and allows higher power levels that would not otherwise be possible. The thermal power level is varied by increasing or decreasing the forced recirculation through the recirculation pumps.

Return of cold condensate to the downcomer region of a boiling water reactor has limited ability to directly condense steam because the condensate return occurs below the liquid mixture level. This addition of cold water to the downcomer causes the core flow to increase. The core power increases because of the core flow increase and the cold condensate reduces the core inlet temperature which further increases power.

By contrast, returning the condensate inside the core barrel above the core reduces core flow and core power. The manometer effect of higher-density water in the downcomer versus lower-density fluid inside the core barrel is what drives natural circulation in a boiling water reactor. This manometer effect is intentionally exaggerated in a boiling water reactor without forced circulation due to jet pumps or external recirculation loops by increasing the height of the upper plenum with a chimney above the core. Return of isolation condenser system condensate into the lower density region above the core reduces the manometer effect, reduces core flow, causes core voiding to increase, and consequently the core power decreases. Since the region above the core has a higher steam quality, the return of the cold isolation condenser system condensate region is very effective in condensing steam which further increases the fluid density on the core side of the manometer. Direct condensation of steam also rapidly lowers the reactor pressure vessel pressure.

SUMMARY

This section provides a general summary of the disclosure and is not a comprehensive disclosure of its full scope or all of its features.

The isolation condenser system (ICS) consisting of one or more heat exchangers returns liquid condensate to the reactor pressure vessel (RPV) of a boiling water reactor (BWR). Typically, condensate is returned to the downcomer region of the boiling water reactor pressure vessel. The present disclosure returns the condensate inside the core shroud above the core into the upper plenum or chimney region of the boiling water reactor.

The isolation condenser system lowers reactor pressure vessel pressure following an isolation event. Any increase in core power that results from the condensate return into the downcomer region of the reactor pressure vessel reduces the effectiveness of the isolation condenser system. The reactor pressure vessel pressure increase can be unacceptably large especially when the isolation event occurs concurrent with a failure or delay in scram (reactor shutdown) such as in an anticipated transient without scram. Return of the isolation condenser system condensate into the region above the core, on the other hand, dramatically increases the effectiveness of the isolation condenser system and substantially lowers the peak pressure that will occur. This lowering of the pressure provides additional time for an alternate slower scram mechanism to function during an anticipated transient without scram scenario where the faster primary scram mechanism has failed or was severely degraded.

The isolation condenser system condensate is returned to the reactor pressure vessel of the boiling water reactor inside the core barrel above the core rather than into the downcomer. This increases isolation condenser system effectiveness and makes it possible to greatly reduce the magnitude of the pressure increase that would otherwise occur consequently, the opening of safety relief valves can be avoided which retains fluid inventory in the reactor pressure vessel. The need for high pressure emergency core cooling systems can be eliminated because the water inventory is not being depleted. The reactor pressure vessel and attached piping can be designed for a lower pressure. Containment size can be decreased, and/or the design pressure and temperature reduced. Dynamic loads to the containment caused by blowing down of the reactor pressure vessel through relief valves can be eliminated. Mitigation of the anticipated transient without scram by a slower alternate scram mechanism becomes possible so that a backup system for reactivity control via injection of a neutron-observing fluid; i.e., standby liquid control system can be eliminated.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1:
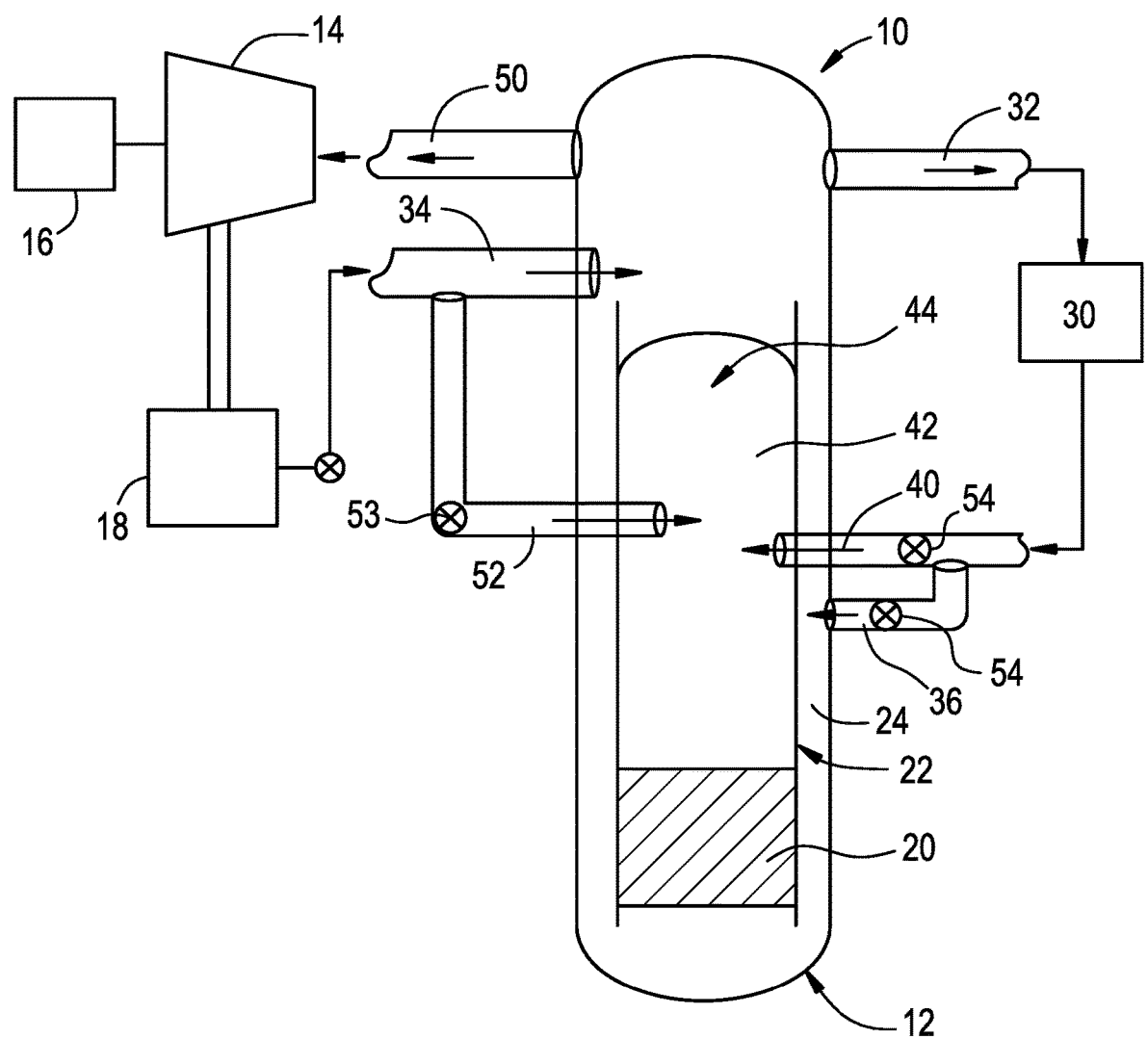
FIG. 1 is a diagram of a nuclear power generating system including a nuclear reactor and a condenser isolation system and feedwater return system according to the invention.
Figure 2:
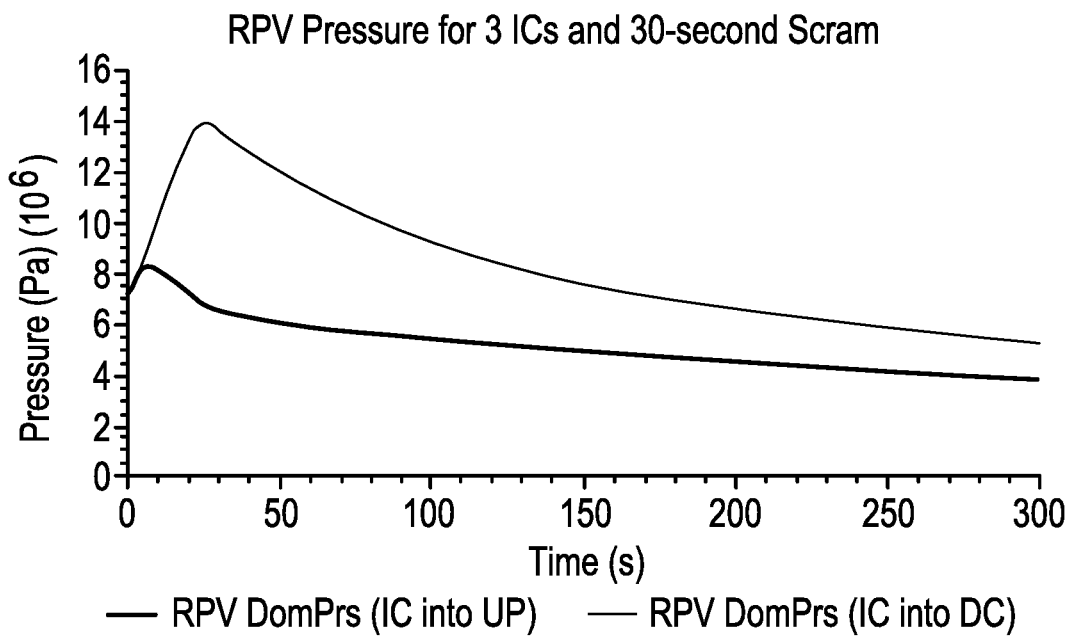
FIG. 2 is a graph comparing reactor pressure vessel pressure for three isolation condenser trains with the condensate returned to the upper plenum verses the downcomer.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a boiling water nuclear reactor 10 includes a reactor pressure vessel 12 which supplies steam to a turbine 14 which drives an electricity generator 16. The steam from the turbine 14 is directed to a condenser system 18. Water from the condenser system 18 is returned to the reactor pressure vessel 12. The reactor pressure vessel 12 is divided radially into two basic areas so that the reactor core 20 is inside a shroud 22 so that downward flow in the downcomer 24 can be redirected upward through the reactor core 20.

An isolation condenser system 30 is in communication with an isolation condenser system steam supply line 32. Condensate from the isolation condenser system is reintroduced into the reactor pressure vessel 12 during system shutdown.

The feedwater from the condenser system 18 is introduced into the downcomer region 24 of the reactor pressure vessel 12 radially outside the core shroud 22 via one or more lines 34 as is known in the art. Sparger piping can be utilized to distribute the feedwater as is known in the art. The condensate from the isolation condenser system 30 is also usually introduced into the downcomer region 24 of the reactor pressure vessel 12 radially outside the core shroud 22 via one or more lines 36. Sparger piping can be utilized to distribute the condensate as is known in the art.

An example embodiment includes a return line 40 for returning all or a part of the isolation condenser system 30 condensate inside the core shroud 22 into either the chimney 42 or upper plenum 44 region of the reactor pressure vessel 12 using one or more lines 40 (one of which is shown). The isolation condenser system 30 condensate flow through line 40 that is returned inside the core shroud 22 and reduces the core flow and will generally cause the core power to decrease. Steam supply to the isolation condenser system 30 occurs higher in the reactor pressure vessel 12 above the normal operating water level. The isolation condenser system 30 steam supply 32 may be from one or more separate lines 32 or extracted from one or more main steam lines 50 that is connected to the turbine 14. Normally feedwater 34 is returned into the downcomer region 24 above the upper plenum at about the level of the steam separators (not shown).

At least one embodiment includes an alternative feedwater supply line 52 with a control valve 53 to selectively supply the feedwater inside the core shroud 22 into either the chimney 42 or upper plenum 44 of the reactor pressure vessel 12. The portion of feedwater that is directed inside the core shroud 22 will also tend to reduce core power by reducing the core flow and will not cause the power to increase by reducing the temperature of water entering the core from the downcomer. Core power can be regulated by regulating the fraction of feedwater flow that is directed inside the core shroud 22 via one or more alternative supply lines 52. This may occur with or without the operation of the isolation condenser system 30. The feedwater, like the isolation condenser system 30 condensate, may be distributed by sparger piping as is known in the art.

Simulation results are presented for a natural circulation boiling water reactor accident scenario of an anticipated transient without scram. The transient scenario begins with abrupt closure of the turbine stop valve at one second which would cause a scram signal. The mechanisms for hydraulic scram are assumed to fail so the only remaining way to scram is for the control rod drive motors to drive the control blades into the core. This scram is significantly slower than the hydraulic scram. The scram speed is constant with linear insertion of the control blades beginning at the turbine stop valve trip signal plus an assumed short electronic delay. The scram time is defined as the elapsed time for a controlled blade that is initially fully withdrawn from the core to become fully inserted. In the simulations, the condensate return valves 54 for the specified number of isolation condensers 30 also began to open at the turbine stop value trip signal and complete their stroke linearly to full open in 10 seconds.

The simulation results are divided into 3 sets. The first set of results are depicted in FIG. 2 through FIG. 5. These results all have a 30 second scram time so that the same basis can be used for comparing the responses when the isolation condenser condensate is returned to the upper plenum region 44 instead of to the downcomer region 24. The upper plenum 44 is the region above the core 20 from the exit of the fuel channels up to entrance to the steam separators and may be exaggerated by the presence of a chimney 42. In the simulations described above, the evaluation of the isolation condenser return 40 is 13.02 m above the bottom of the reactor pressure vessel for both isolation condensers 30 returned to the downcomer 24 or upper plenum 44. The return into the upper plenum 44 corresponds to 3.73 m above the fuel channel exit or about the middle elevation of the chimney 42. The pressure responses shown in FIG. 2 clearly show how much more effective the isolation condensers are at reducing reactor pressure vessel pressure when the isolation condenser return 40 into the upper plenum 44 as compared to the downcomer 24. In fact, the 30-second scram time was chosen for this illustration because the case with downcomer return 36 will experience an unacceptably high reactor pressure vessel 12 pressure if a longer scram time is used.

Figure 3:
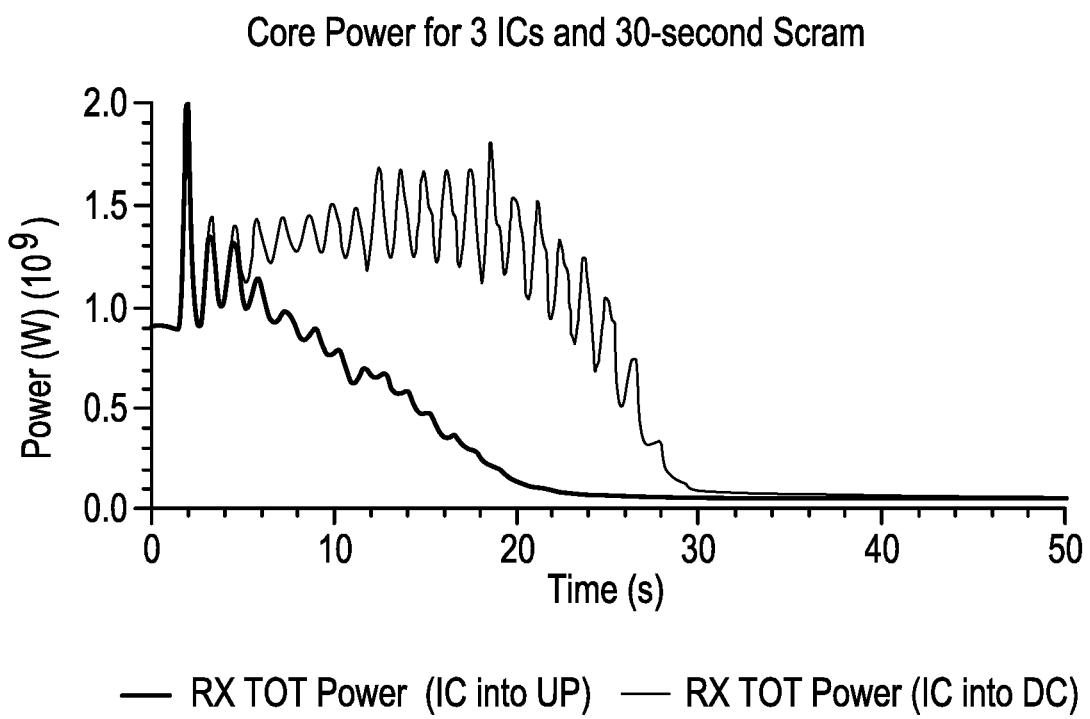
FIG. 3 is a graph comparing reactor core power for three isolation condenser trains with the condensate returned to the upper plenum verses the downcomer.
Figure 4:
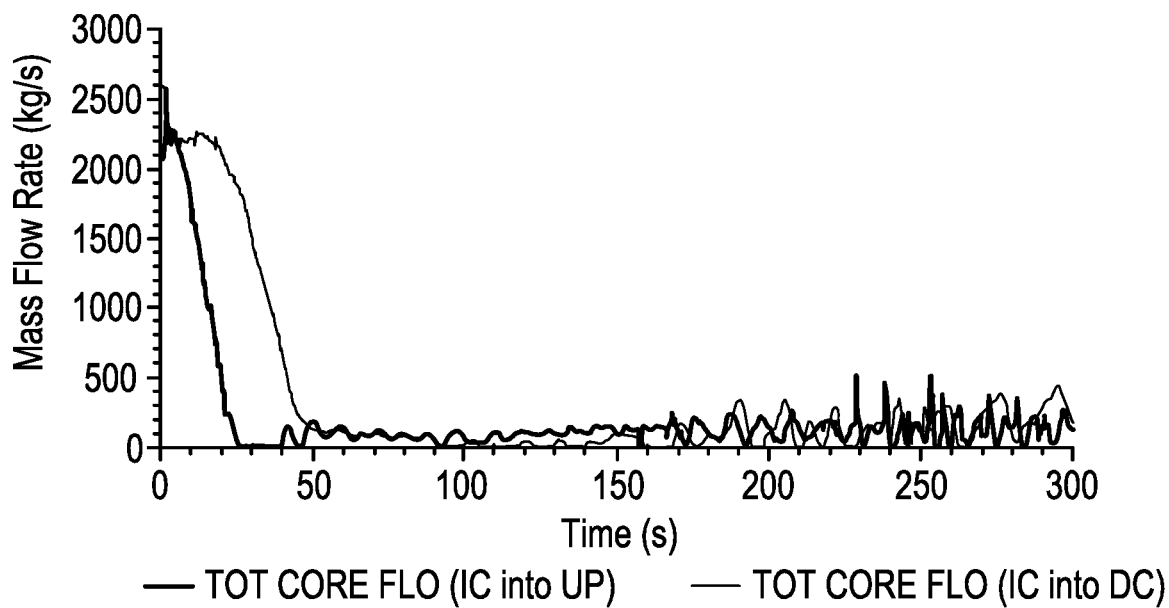
FIG. 4 is a graph comparing reactor core mass flow rate for three isolation condenser trains with the condensate returned to the upper plenum verses the downcomer.
Figure 5:
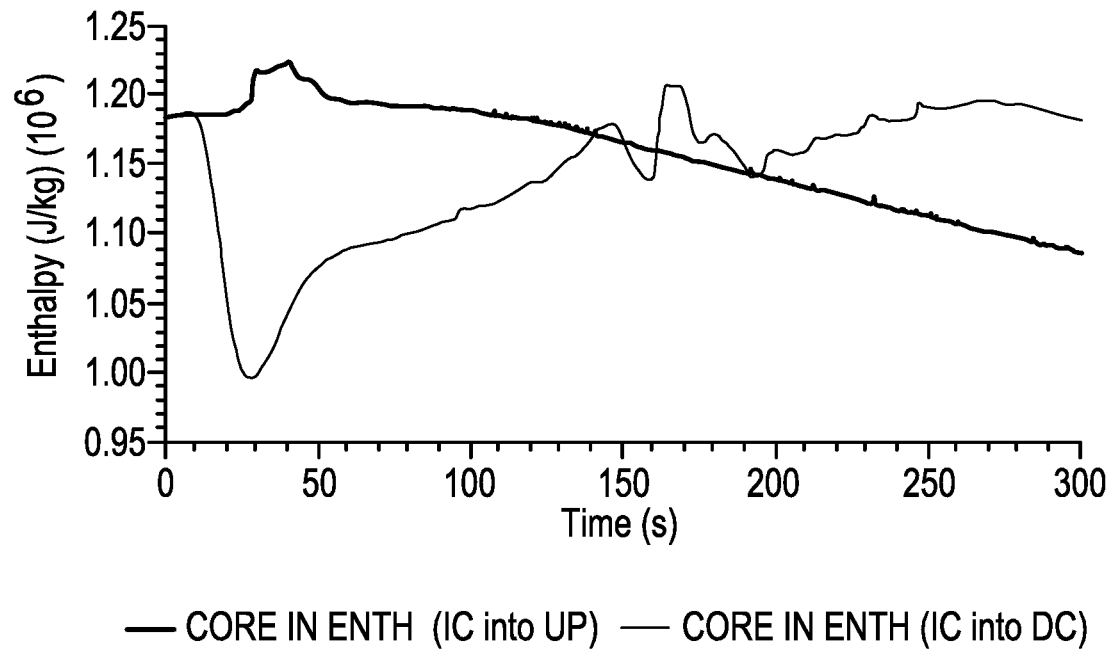
FIG. 5 is a graph comparing reactor core inlet enthalpy for three isolation condenser trains with the condensate returned to the upper plenum verses the downcomer.

The reason that isolation condenser return 40 to the upper plenum 44 is much more effective at controlling reactor pressure vessel 12 pressure than isolation condenser return 36 into the downcomer 24 can be understood from the comparison of the reactor power responses in FIG. 3. As early as five seconds, it can be seen that the power is lower than when the isolation condenser 30 return is into the upper plenum 44. This is because isolation condenser return 40 into the upper plenum 44 causes a decrease in core flow after about 10 seconds as shown in FIG. 4 whereas isolation condenser return 36 into the downcomer 24 shows no core flow decrease until about 25 seconds when the control blades began to reduce core power. Isolation condenser return 40 to the upper plenum 44 suppresses core flow earlier by increasing the density of the fluid in the upper plenum region 44. Isolation condenser return 36 to the downcomer 24 on the other hand is on the opposite side of the manometer which would tend to increase core flow although this effect appears to be insignificant. The impact that the cold isolation condenser condensate water addition to the downcomer 24 has on the core inlet enthalpy is shown in FIG. 5. The decrease in core inlet enthalpy reduces voids in the core 20 and causes the power to increase. Cold water into the upper plenum 44 has no initial impact on the core inlet enthalpy but later as the water is heated by steam in the upper plenum 44 causes a surge in separator drain flow and a temporary increase in steam carry under which causes the momentary increase in core inlet enthalpy in the timeframe from 20 to 50 seconds. This increase in core inlet enthalpy helps to prevent an increase in core power long enough for the scram to become effective. The amount of condensate return is important in determining the core power, flow and enthalpy responses.

Figure 6:
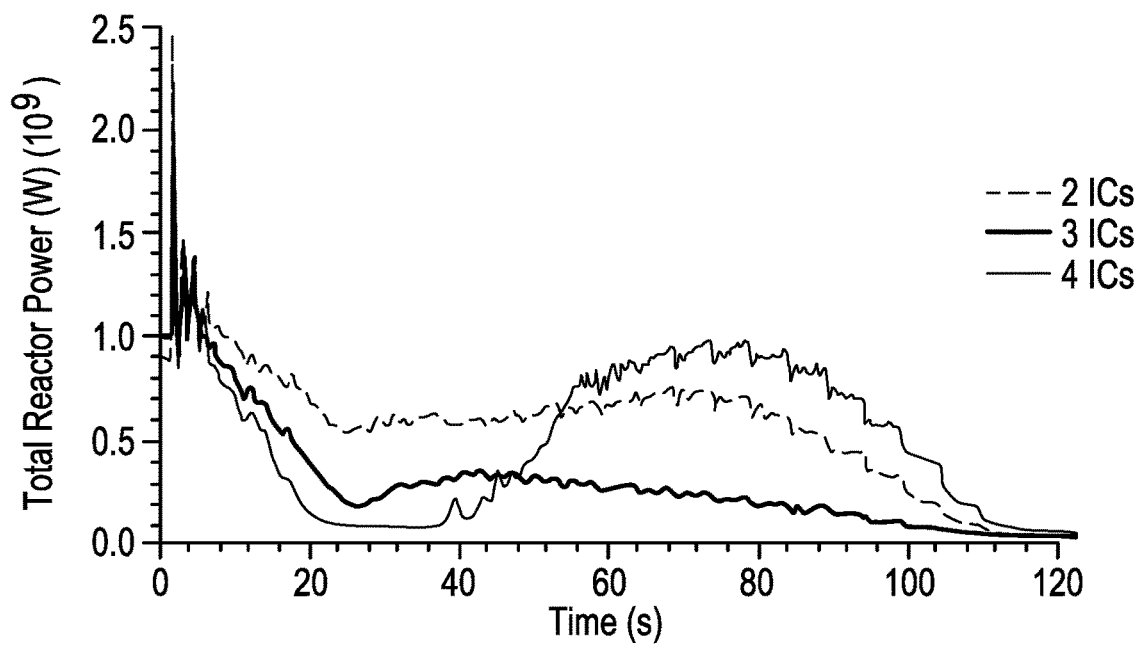
FIG. 6 is a graph comparing reactor core power with the condensate returned to the upper plenum for different numbers of isolation condenser trains.
Figure 7:
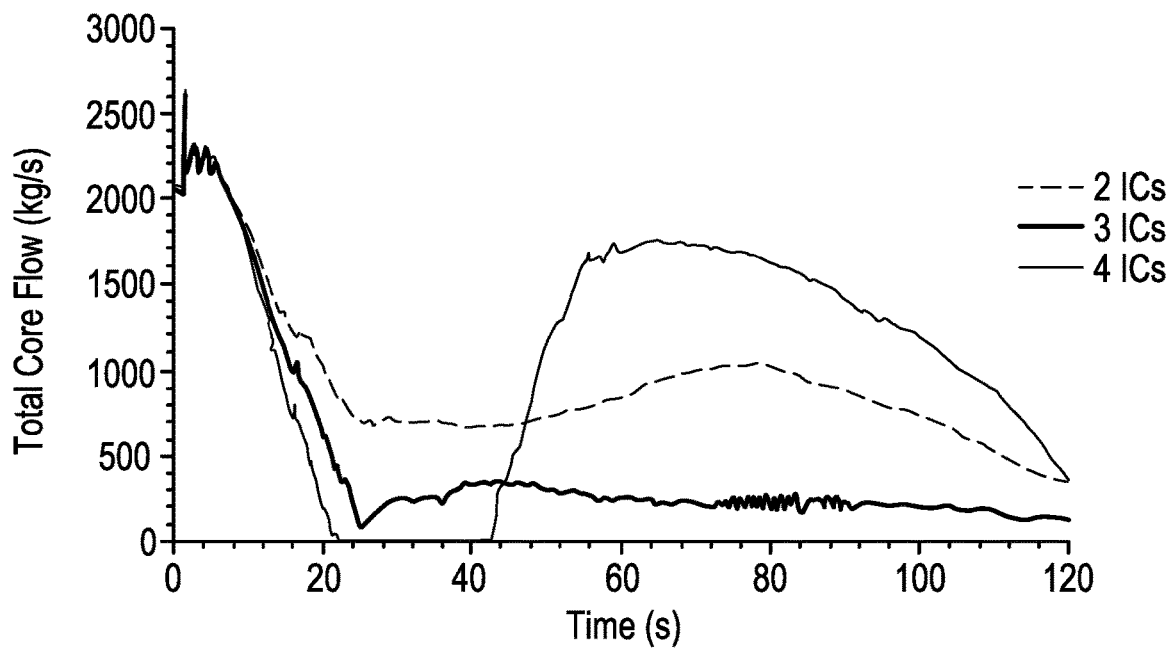
FIG. 7 is a graph comparing reactor core mass flow rate with the condensate returned to the upper plenum for different numbers of isolation condenser trains.
Figure 8:
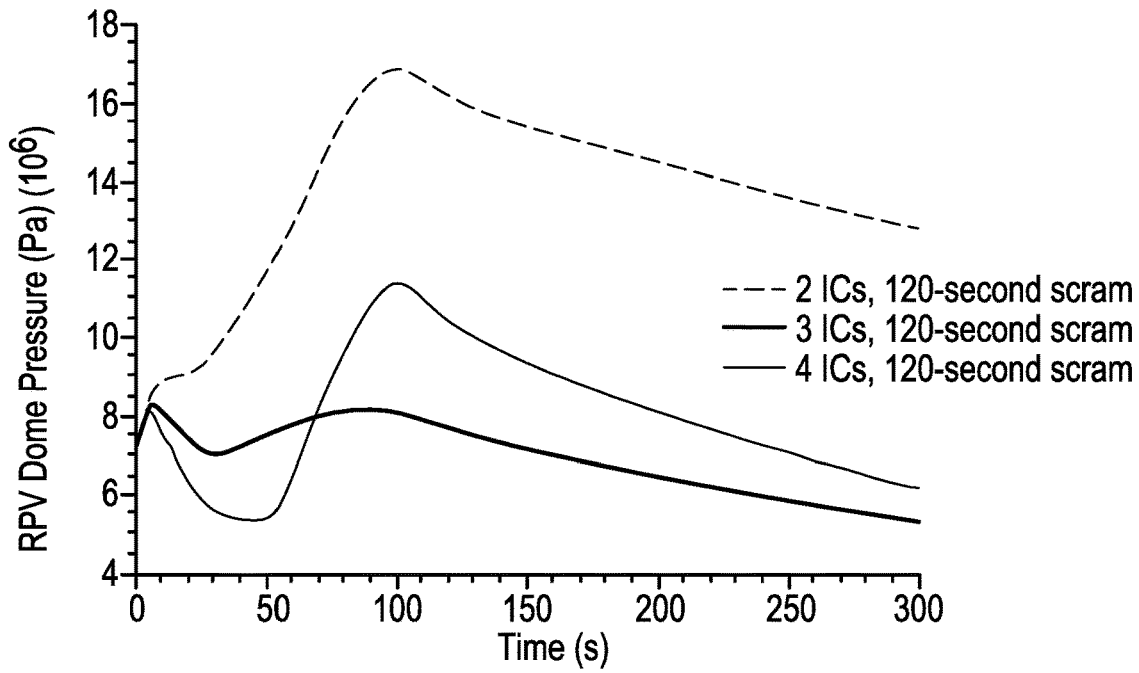
FIG. 8 is a graph comparing reactor pressure vessel pressure with the condensate returned to the upper plenum for different numbers of isolation condenser trains.

The first set of results depicted in FIG. 2 through FIG. 5 were shown for the 3 out of the 4 isolation condenser trains functioning so that failure of one isolation condenser train could be assumed for safety analysis. A second set of results in FIG. 6 through FIG. 8 shows how the number of operating isolation condenser trains impact the calculated reactor pressure vessel pressure, core power, and core flow responses. These results are all based on a 120 second scram time where the isolation condenser return is into the upper plenum 44. The scram time longer than 30 seconds is not shown for isolation condenser return 36 into the downcomer 24 because it leads to an unacceptably high reactor pressure vessel 12 pressure greater than 14 MPa (~2000 psia).

The power responses in FIG. 6 show that the three trains of isolation condenser 30 are most effective in limiting the core power prior to the scram starting to become effective around 80 seconds. The amount of condensate from two isolation condenser trains 30 is not sufficient to limit the reactor pressure vessel 12 pressure increase as shown in FIG. 8 so the increasing pressure collapses core voids and partially counters the full benefit of returning the isolation condenser 30 condensate to the upper plenum 44. When all four isolation condenser trains are used, the core flow is so suppressed that it reverses as shown in FIG. 7 whereas three isolation condenser trains suppress the core flow but do not cause it to reverse. The addition of too much water into the upper plenum 44 (four isolation condenser trains) later cause a resurgence in core flow as it is heated, expands, and is circulated through the separator drains back to the downcomer 24. The subsequent flow surge will produce an unfavorable resurgence in core power as shown by the curve for four isolation condenser trains shown in FIG. 6. The resurgence in core power will also result in an increase in reactor pressure vessel 12 pressure as shown by the curve for four isolation condenser trains in FIG. 8. Note that the reactor pressure vessel peak pressure is lowest for three isolation condenser trains as shown by the curve in FIG. 8. Together, FIG. 5 through FIG. 7 responses show why three isolation condenser trains is the preferred number for mitigating this anticipated transient without scram scenario in the boiling water reactor 10.

Figure 9:
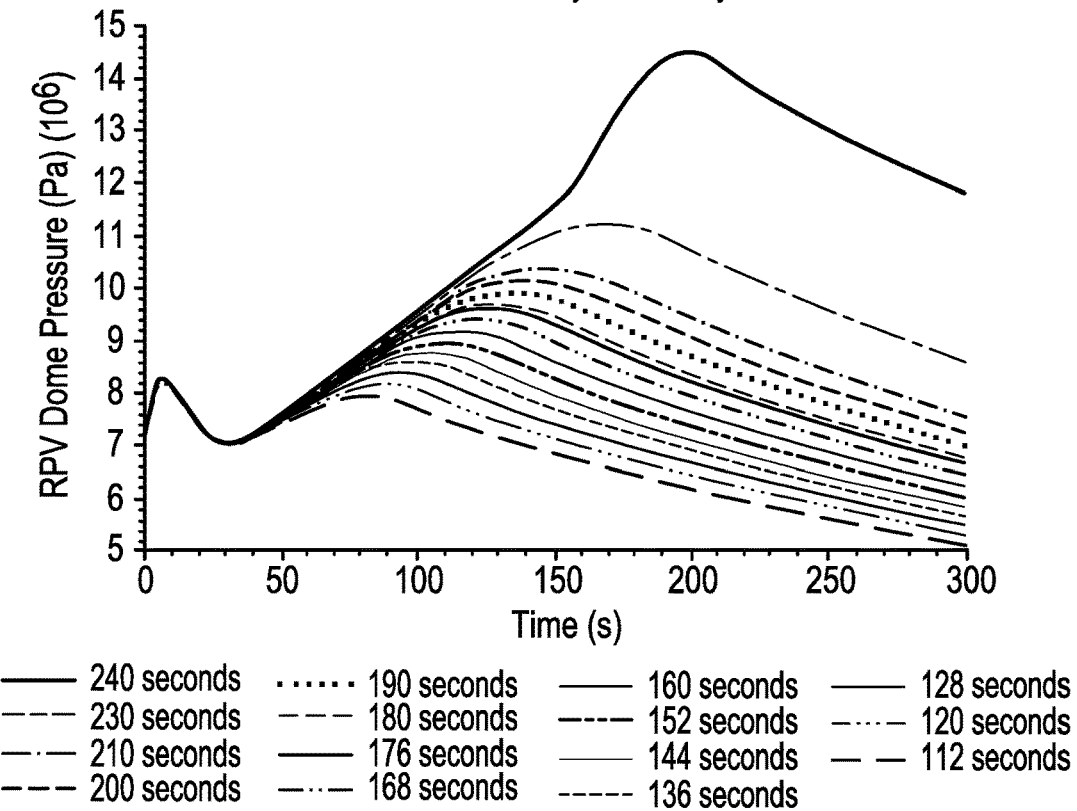
FIG. 9 is a graph comparing reactor pressure vessel pressure with the condensate returned to the upper plenum for three isolation condenser trains and different scram times.

The third and final set of responses are shown in FIG. 9. For these calculations, three isolation condenser trains with condensate returning to the upper plenum 44 are simulated and the scram time was varied. The results in FIG. 9 show that the peak reactor pressure vessel pressure of ~11.2 MPa for a scram time of 230 seconds is well below the ~14 MPa peak pressure for a scram time of 30 seconds (FIG. 2) when the isolation condenser condensate returns to the downcomer 24. The key element of the present disclosure is to return the isolation condenser system 30 condensate to the upper plenum region 44 instead of the downcomer 24. Doing so provides a successful anticipated transient without scram mitigation strategy for the boiling water reactor 10 that could not otherwise be achieved without removing water inventory from the reactor pressure vessel 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A boiling water nuclear reactor system, comprising:
a reactor pressure vessel;
a reactor core disposed in the reactor pressure vessel;
a core shroud surrounding the reactor core;
a downcomer region disposed between an inner surface of the reactor pressure vessel and the core shroud;
a steam line connected to an upper end of the reactor pressure vessel; and
an isolation condenser system receives steam from the reactor pressure vessel and includes a condensate return line that is directly connected to the core shroud and selectively returns condensate directly inside the core shroud above the reactor core into one or both of an upper plenum or chimney region of the core shroud, the condensate return line includes a valve that opens flow through the condensate return line during a reactor shutdown.

2. The boiling water nuclear reactor system according to claim 1, wherein the condensate return line further includes a split portion that returns condensate inside the downcomer region.

3. The boiling water nuclear reactor system according to claim 1, further comprising:
a turbine receiving steam from the reactor pressure vessel; and
a main condenser system receiving the steam from the turbine and connected to the reactor pressure vessel by a feedwater return line for returning condensate from the main condenser system.

4. The boiling water nuclear reactor system according to claim 3, wherein the feedwater return line selectively returns condensate inside the core shroud above the reactor core into one or both of an upper plenum or chimney region of the core shroud.

5. The boiling water nuclear reactor system according to claim 4, wherein the feedwater return line includes a first split portion that returns condensate inside the downcomer.

6. The boiling water nuclear reactor system according to claim 3, wherein the feedwater return line returns condensate inside the downcomer.

7. A boiling water nuclear reactor system, comprising:
a reactor pressure vessel;
a reactor core disposed in the reactor pressure vessel;
a core shroud surrounding the reactor core;
a downcomer region disposed between an inner surface of the reactor pressure vessel and the core shroud;
a steam line connected to an upper end of the reactor pressure vessel;
a turbine receiving steam from the reactor pressure vessel;
a main condenser system receiving the steam from the turbine and connected to the reactor pressure vessel by a feedwater return line for returning condensate from the main condenser system, the feedwater return line selectively returning condensate inside the core shroud above the reactor core into one or both of an upper plenum or chimney region of the core shroud, and
an isolation condenser system receives steam from the reactor pressure vessel and includes a condensate return line that is directly connected to the core shroud and selectively returns condensate directly inside the core shroud above the reactor core into one or both of an upper plenum or chimney region of the core shroud, the condensate return line includes a valve that opens flow through the condensate return line during a reactor shutdown.

8. The boiling water nuclear reactor system according to claim 7, wherein the feedwater return line includes a first split portion that returns condensate inside the downcomer.

9. The boiling water nuclear reactor system according to claim 7, wherein the condensate return line further includes a split portion that returns condensate inside the downcomer region.

* * * * *